United States Patent
Behling et al.

(10) Patent No.: US 6,179,900 B1
(45) Date of Patent: Jan. 30, 2001

(54) PROCESS FOR THE SEPARATION/RECOVERY OF GASES

(75) Inventors: Rolf-Dieter Behling, Hamburg; Klaus-Viktor Peinemann, Geesthacht, both of (DE); Lédia Barreto da Silva, Rio de Janeiro (BR)

(73) Assignees: GKSS Forschungszentrum Geesthacht GmbH, Geesthacht (DE); Petroleo Brasileiro S.A. - Petrobras, Rio de Janeiro (BR)

( * ) Notice: Under 35 U.S.C. 154(b), the term of this patent shall be extended for 0 days.

(21) Appl. No.: 09/168,900

(22) Filed: Oct. 9, 1998

(30) Foreign Application Priority Data

Oct. 9, 1997 (EP) .................................................. 97117445

(51) Int. Cl.$^7$ .......................... B01D 53/047; B01D 53/22
(52) U.S. Cl. ...................... 95/45; 95/53; 95/55; 95/96; 95/98; 95/102; 95/116
(58) Field of Search .................................. 95/45, 47–55, 95/96–98, 100–105, 116; 96/4

(56) References Cited

U.S. PATENT DOCUMENTS

| | | | |
|---|---|---|---|
| 3,324,626 | * 6/1967 | Dresser et al. ........................ | 95/53 X |
| 3,713,271 | * 1/1973 | Franz et al. ............................... | 95/53 |
| 4,156,597 | * 5/1979 | Browall .................................. | 95/55 X |
| 4,398,926 | 8/1983 | Doshi ....................................... | 55/16 |
| 4,560,394 | * 12/1985 | McDonald et al. ..................... | 96/4 X |
| 4,654,047 | * 3/1987 | Hopkins et al. ........................ | 95/55 X |
| 4,690,695 | 9/1987 | Doshi ....................................... | 55/16 |
| 4,701,187 | 10/1987 | Choe et al. .............................. | 55/16 |
| 4,732,583 | * 3/1988 | DeLong et al. ......................... | 96/4 X |
| 4,765,804 | * 8/1988 | Lloyd-Williams et al. ............ | 96/4 X |
| 4,863,492 | 9/1989 | Doshi et al. ............................. | 55/16 |
| 5,064,446 | * 11/1991 | Kusuki et al. ............................ | 95/53 |
| 5,224,350 | 7/1993 | Mehra ....................................... | 62/17 |
| 5,233,837 | * 8/1993 | Callahan .................................. | 62/38 |
| 5,248,319 | 9/1993 | Ekiner et al. ............................. | 95/54 |
| 5,314,528 | * 5/1994 | Monereau .................................. | 95/55 |
| 5,332,424 | * 7/1994 | Rao et al. ................................. | 95/47 |
| 5,354,547 | * 10/1994 | Rao et al. ............................ | 95/41 X |
| 5,482,539 | * 1/1996 | Callahan .............................. | 95/45 X |
| 5,632,803 | 5/1997 | Stoner et al. ........................... | 95/53 |
| 5,852,925 | * 12/1998 | Prasad et al. ........................ | 95/55 X |

FOREIGN PATENT DOCUMENTS

| | | |
|---|---|---|
| 4232496 | 3/1994 | (DE) . |
| 0 219 878 | 4/1987 | (EP) . |
| 0 336 999 | 10/1989 | (EP) . |
| 0684066 | 11/1995 | (EP) . |

\* cited by examiner

Primary Examiner—Robert H. Spitzer
(74) Attorney, Agent, or Firm—Sughrue, Mion, Zinn Macpeak & Seas, PLLC

(57) ABSTRACT

A process for the separation/recovery of gases is described where the desired component to be separated from the gaseous mixture is present in low/very low molar amount and/or low/moderate pressure, the process comprising contacting the gaseous mixture with a separation membrane unit containing high permeability/medium selectivity membranes which separate the feed stream into a permeate stream, enriched in the desired component and at a lower pressure and a retentate stream lean in the desired component and at a higher pressure. The retentate stream is made to convey its pressure to the permeate stream which then is directed to an adsorption PSA unit for further purification of the permeate stream so that the effluent stream from the PSA unit which contains the purified component has a purity of up to 99.90%. The process is useful for separating hydrogen from refinery off gases such as FCC gases and can also be applied to other gases such as helium and any other valuable gases present in gaseous streams in low to very low molar contents and low to moderate pressures.

21 Claims, 5 Drawing Sheets

PROCESS FOR THE SEPARATION/RECOVERY OF GASES

FIELD OF THE INVENTION

The present invention relates to a process for the separation/recovery of gases. More specifically the present invention relates to a process for the separation/recovery of a desired component from multi-component gaseous streams with the aid of membranes of high permeability and medium selectivity combined with adsorption under pressure swing (also known as Pressure Swing Adsorption or PSA). The process of the present invention is specially directed to gaseous streams in which the desired component (s) to be separated/recovered is present at low molar contents and/or low pressure, which renders the state-of-the-art processes using membranes/PSA combined processes inapplicable for economic reasons. The present process is equally suited to gaseous streams where the desired component is present at very low molar concentration and moderate pressure.

The potential use of the present invention encompasses a wide variety of mixtures of gases of industrial use present at low molar contents and/or low pressure in gaseous streams, the separation/recovery of which is of great economical appeal.

The separation of useful industrial gases using the process of the present invention is rendered possible by the use of the polymeric permeable membrane, of high permeability and medium selectivity, this membrane selectively permeating molecules of small kinetic diameter, for example hydrogen and helium. An additional economic advantage stems from the fact that the relatively high pressure inventory of the non permeate stream or retentate is transferred to the permeate stream, with high savings in energy.

The present process is specially useful in the light of the deep interest in the separation/recovery of hydrogen from refinery streams where hydrogen exists in relatively low molar content, for example between 10 and 30 mol %, and low pressure, for example between 8 and 15 bar. The high purity hydrogen recovered through the present process allows the hydrogen recovered to be used in hydrotreating processes, widely used in Brazil in view of the heavy character of the local petroleum oils.

Other industrially interesting gases can be separated/recovered in high yield and low energy consumption by using the present process for the separation/recovery, provided these gases have a small kinetic diameter. For example, helium is an interesting industrial gas which can be separated/recovered from any gas stream containing helium even in very low concentration by using the process of the present invention.

BACKGROUND INFORMATION

Processes designed for the production of a high purity product stream at high recovery from gaseous feed streams by combining single or multi-stage membrane systems and multi-bed PSA units are well-known. The use of stand-alone membrane units to produce a very high purity stream, i.e., greater than 99%, was found to be inefficient since large membrane areas and power demands were required in order to achieve this high purity at high recovery rates. PSA units, on the other hand, proved to be very efficient in producing high purity components from feed streams containing the desired component at concentrations greater than 50 mole %, but become less efficient for treating relatively low purity, less than 50% streams to yield a high purity product at high recovery rates.

Membranes have been used to recover or isolate a variety of gases, including hydrogen, helium, oxygen, nitrogen, carbon monoxide, carbon dioxide, water vapor, hydrogen sulfide, ammonia, and light hydrocarbons.

Membrane separations are based on the relative permeability of two or more gaseous components through the membrane. To separate a gas mixture into two portions, one richer and one leaner in at least one component, the mixture is brought into contact with one side of a semi-permeable membrane through which at least one of the gaseous components selectively permeates.

A gaseous component which selectively permeates through the membrane passes through the membrane more rapidly than at least one other component of the mixture. The gas mixture is thereby separated into a stream which is enriched in the selectively permeating component or components and a stream which is depleted in the selectively permeating component or components. The stream which is depleted in the selectively permeating component or components is enriched in the relatively non-permeating component or components. A relatively non-permeating component permeates more slowly through the membrane than at least one other component of the mixture. An appropriate membrane material is chosen for the mixture so that some degree of separation can be achieved.

Membranes for hydrogen separation have been fabricated from a wide variety of polymeric materials, including cellulose esters, polyimides, polyaramides and polysulfones. An ideal gas separation membrane is characterized by the ability to operate under high temperature and/or pressure while possessing a high separation factor (selectivity) and high gas permeability. Normally polymers possessing high separation factors have low gas permeabilities, and vice-versa.

In any case it is very uneconomical to purify a permeating desired component by membranes only to high purity levels higher than 99%.

On the other hand, a process using pressure swing adsorption or PSA is an adequate tool for separating and purifying hydrogen gas contained in a gaseous mixture with impurities which are selectively adsorbed by one or more adsorbing beds in a PSA system. Adsorption in these beds occurs at a more elevated pressure, the impurities which are more selectively adsorbed being desorbed through pressure reduction at a lower desorption pressure. It is possible to purge the beds at this lower desorption pressure for desorption and further withdrawal of impurities, before repressurization at higher adsorption pressure for adsorption of impurities of further amounts of the feed gaseous mixture during the working out of the process cycle.

As practised in the technique, the PSA process is commercially very important for the purification of hydrogen gas. The purity of hydrogen can be higher than 99.99%. The PSA process can be used to treat a wide variety of available feed streams and is not limited to a specific stream. There are no pre- or post treatment requirements, except for the withdrawal of impurities in order to avoid unduly adsorbent degradation. Further, there is no practically reduction in pressure from the feed stream and the product gas so that the product gas is available at the pressure level for further use downstream of the PSA system and for repressurization of each bed up to the adsorption pressure.

Pressure of hydrogen-containing streams submitted to separation through PSA reach 40 bar (600 psig) or higher.

The number of adsorbing beds in PSA systems vary widely, from two to 12 beds, on a case-to-case basis.

Thus, U.S. Pat. No. 4,398,926 teaches a process for the selective permeation using membranes combined to PSA where the technique of selective permeation separates a major amount of the impurities of the desired component which is contained in a gaseous feed stream at high pressure and relatively impure, final separation and purification being effected in a PSA system to which the membrane system is integrated. It is alleged that in this way the recovery of the product is improved, without sacrificing the purity, while the overall cost for producing the product is reduced. The process is said to be specially useful to treat high pressure streams, that is, having pressures higher than 40 bar (600 psig). It should be understood that the PSA systems show drawbacks when operating at high pressures of adsorption, that is, above 40 bar. At these high pressures the PSA system becomes very expensive in terms of investment costs. The trend is that a higher amount of product be retained in the bed at these high pressures, so that the desired component, for example hydrogen, will be discarded from the bed together with the impurities during the counter-current depressurization step. Thus U.S. Pat. No. 4,398,926 provides an optimized PSA process for the treatment of gaseous streams at high pressures. Thus, a portion of the excess pressure is used in the membrane system for a preliminary purification of the desired component, for example, hydrogen. It should be understood that the stream to be treated according to the claimed process should present a minimum molar amount in hydrogen near to 40% in order that the process be applied. The usual hydrogen content of the stream to be treated is usually near 90 mole % or higher, the balance of the molar content being impurities. The process is to be applied to gaseous streams of various gases, provided that the stream shows a high pressure and contains a relatively high content in impurities besides the desired gaseous component.

In U.S. Pat. No. 4,398,926 a first separation is effected in a Prism separator which contains a permeable membrane. The membrane of the separator is able to selectively permeate hydrogen for a pressure of the feed gas of the separator of the order of 40 bar (600 psig) and up to 134 bar (2000 psig) or more. The separator possesses an inlet means for the high pressure gas and and outlet means for withdrawing permeate gas enriched in hydrogen at a lower pressure. A further outlet means is provided in order to withdraw the non-permeate portion or retentate, from the gaseous stream. Commercial membranes useful in the practice of U.S. Pat. No. 4,398,926 comprise hollow fibers, usually made of polysulfones covered by silicon rubber, mounted within the structure of the separator. In the Prism separators the hollow fibers are assembled in compact bundles in order to establish the large membrane area available for the path of the hydrogen being separated from impurities present in the feed gas.

U.S. Pat. No. 4,690,695 teaches an improved process for separating gases with special emphasis on obtaining a high purity product. This patent cites that the permeable membranes able to selectively permeate a component from a gaseous mixture have their use limited by the pressure differential maintained on opposite sides of the membrane, the passage of the more permeable component through the membrane being enhanced as the pressure differential across the membrane is increased. On the other hand, the pressure differential is limited by practical operational conditions such as the strength of the membrane itself, and the compression costs to be applied in the separations. Even if several membranes are used in series, it is not possible to obain high purity gas at high recovery levels. In the process taught in U.S. Pat. No. 4,690,695 the bulk separation is effected using membranes, the permeate gas being directed to a PSA system for separation and recovery of high purity product gas. The waste gas from PSA is compressed and combined to the feed gas which should be directed to the membrane, from which non permeate gas or retentate is withdrawn under high pressure. The described process is useful for refinery gases which are mixtures of hydrogen and methane, for example those having a hydrogen content around 40 mole %, refinery gases which are mixtures of helium and nitrogen or still separation of air from which an oxygen enriched stream is desired. The product obtained is 99.99+% pure.

U.S. Pat. No. 4,701,187 teaches a process for the separation and recovery of a component from a gaseous mixture. The gaseous feed mixture is first separated in a membrane unit separation in order to yield a gaseous stream enriched in the desired component. The concentrated gaseous stream is later on separated in an adsorption unit which contains an adsorbent which selectively adsorbs the non-desired gaseous components, thus yielding a purified product stream. The non-desired gaseous components are further desorbed and a purge stream from the adsorption unit containing non-desired gaseous components together with a portion of the desired components is recycled to the gaseous feed mixture. In the process described in U.S. Pat. No. 4,701,187 the membrane used has high selectivity and low permeability. The initial molar content of the desired component is high. The technique described in this patent, if applied to gaseous streams of low molar content and/or at low pressure in the desired component will yield less than optimum results, as regards the molar content of the desired component recovery and will demand high energy input.

U.S. Pat. No. 4,863,492 teaches an integrated membrane/PSA process which yields a mixed gaseous product of pre-set gas ratio which can be adjustably monitored and a second gaseous component of high purity. The permeated stream from the permeable membrane system is fed to the PSA unit and the purge gas from the PSA unit is compressed and mixed to the non-permeate stream or retentate in order to obtain the mixed product gas. The pressure of the permeate stream is monitored in order to set the gas ratio of the mixed product gas. The process is used to set the composition of synthesis gas ($H_2$:CO) to a desired ratio and does not apply to the purification of hydrogen.

European Patent application EP 0684066 A2 teaches a method of recovering a light element comprising hydrogen or helium from a high pressure feed stream. The feed stream comprises the light element in a concentration of less than 30% by volume and also hydrocarbons and trace heavy contaminants. The trace heavy contaminants are removed from the high pressure feed stream by adsorption in one or more beds of activated carbon and the feed stream is passed at high pressure through a membrane unit which allows permeation of the light element. The membrane unit produces a process stream enriched to somewhere above 40% in the light elements and a mass flow rate that is only a fraction of the mass flow rate of the feed stream. The process stream is then compressed and subjected to a pressure swing adsorption process utilizing one or more adsorbents to at least adsorb the hydrocarbons to produce a product stream highly enriched in the light element to 98% enriched or above. The energy demand for recompression is determined by the flow rate of the permeate stream.

German DE 4232496 A1 teaches solvent-resistant permeable membranes molded from solutions in non-toxic solvents of polyamideimides prepared from dicarboxylic aromatic acids and diamines, the membranes being useful for the separation/chemical conversion of gases.

U.S. Pat. No. 5,248,319 teaches blends of aromatic polyamides, polyimides and polyamide-imides having high permeabilities to hydrogen and helium. The selectivities presented in this patent have been determined for pure gases. As for comparison purposes selectivities have to be determined for actual gaseous mixtures, data of this patent cannot be used as standards.

In view of the fact that the open literature is mainly directed to the separation/recovery of gases at high pressures and/or high molar contents in the desired component—for example, 40, 50 or even 90 mole % content—the polymeric membranes usually employed are preferably of high selectivity, low permeability. Besides, the described processes are directed to gaseous streams at high pressures, typically 60–90 bar. Therefore the state-of-the-art publications do not mention adequate membranes for the separation/recovery of gases present at low molar contents and/or low pressures, neither there is any mention whatsoever of processes which make possible the separation/recovery, in the industrial scale, of gases present at molar contents as low as 10–30% associated to pressures as low as 8 to 15 bar. Therefore is it concluded that the membranes and processes as described in the open literature, if applied to the separation/recovery of components at low molar contents/low pressures, will not reach the amounts of separation/recovery industrially and economically sought. Thus, in spite of certain references such as U.S. Pat. No. 4,701,187 mention that the gaseous stream to be treated may contain of from 20 mole % of the desired component, such a low molar content will yield, under the process conditions described in said patent, extremely low molar contents of the desired component, which in practice renders the process inapplicable to low pressure, low molar content conditions.

In general, literature emphasizes the preference of high selectivity, low permeability membranes. If one considers using the high selectivity membranes of the state-of-the-art processes for a stream containing the desired component at low or very low molar content, part of the membrane performance cannot be utilized because of lack of pressure ratio across the membrane in relation to the high membrane selectivity, thus demanding increased membrane area corresponding to loss in recovery rate, thus rendering the process uneconomical.

The refinery off gas stream effluent from the Fluid Catalytic Cracking (FCC) units constitutes a particular problem as regards the separation/recovery of the hydrogen since this stream contains hydrogen at low pressures (between 8 and 15 bar) and low molar contents (between 10 and 30 mole %). The literature neither teaches nor suggests a system of permeable membrane/PSA able to recover economically hydrogen from these streams of low molar content/low pressure in the desired component. This stems from the fact that the partial pressure/fugacity of the desired component is the main driving force of the separation process using membranes. In the case of refinery off gas from FCC units the low pressures and low molar contents render this driving force extremely limited. Thus, the processes available from known techniques if applied to the unfavorable conditions of such off gas streams are rendered economically unfeasible. The economical unfeasibility stems from the fact that the low pressures require compression to increase the pressure of the feed stream to be permeated through the membrane, the compression costs being excessively high. The most widely used membranes are membranes which present low permeability to hydrogen and high selectivity to hydrogen/methane, so that permeation through this kind of membrane requires the high pressures which avoid that such processes be applied to the separation of gases from streams where the desired component(s) are present in low pressure and/or low molar contents. Also, the use of multi-stage membrane units is prohibitive because of the energy demand for inter-stage recompression.

Thus, in spite of the variety of processes of the state-of-the-art designed to the separation of gases by combining permeable membranes/PSA, there is still the need for a process for the separation/recovery of gases which would be directed to the separation/recovery of desired components from gaseous mixtures where the desired component is present at low pressures and/or low molar contents, such process being effected at low energy demand and the desired component being of high purity (99.9 mol %). Such process is described and claimed in the present invention.

SUMMARY OF THE INVENTION

The present invention comprises, for gaseous streams which include low pressures and/or low molar contents of industrially useful components which are sought to be separated/recovered, the use of a high permeability, medium selectivity membrane for a first separation of the gaseous feed stream in a low pressure stream or permeate, enriched in the desired component and a higher pressure or retentate, lean stream in the desired component. With the aid of a device such as a turbo expander, the inventory pressure of the lean stream is used to increase the pressure of the stream enriched in the desired component so as to increase the pressure of the enriched stream up to levels adequate for the pressure requirements of the PSA unit or system. Alternatively pressure is not transferred and instead retentate stream is directed to a cryogenic unit for recovery of $C2^+$ value, such as ethylene and other gases. In the PSA unit the content of the desired component is increased up to 99.0–99.0 mole %. The recovery of the pressure of the lean stream represents great energy savings. An alternative process considers the recovery of the PSA waste or purge as a recycle stream directed to the initial step of the process. This allows the recovery of hydrogen or another light component from a stream having medium molar contents in the desired component.

Thus, the present invention provides a combined process membrane/PSA for the separation/recovery of gaseous components which are present in the stream at low pressures and/or low molar contents, for example at pressures varying between 8 and 15 bar and molar content from 10 to 30%.

Preferably, the membranes used in the process of the invention are high permeability, medium selectivity glassy polymeric membranes.

The present invention also provides a process for the separation/recovery of gases at low cost and high purity, for example, 99.9 mole %.

The present invention provides further a process for the separation/recovery of gases at moderate overall recovery rates, such as from 60 to 80%, at the lowest possible cost/energy consumption.

DETAILED DESCRIPTION OF THE PREFERRED EMBODIMENTS

Figure 1:
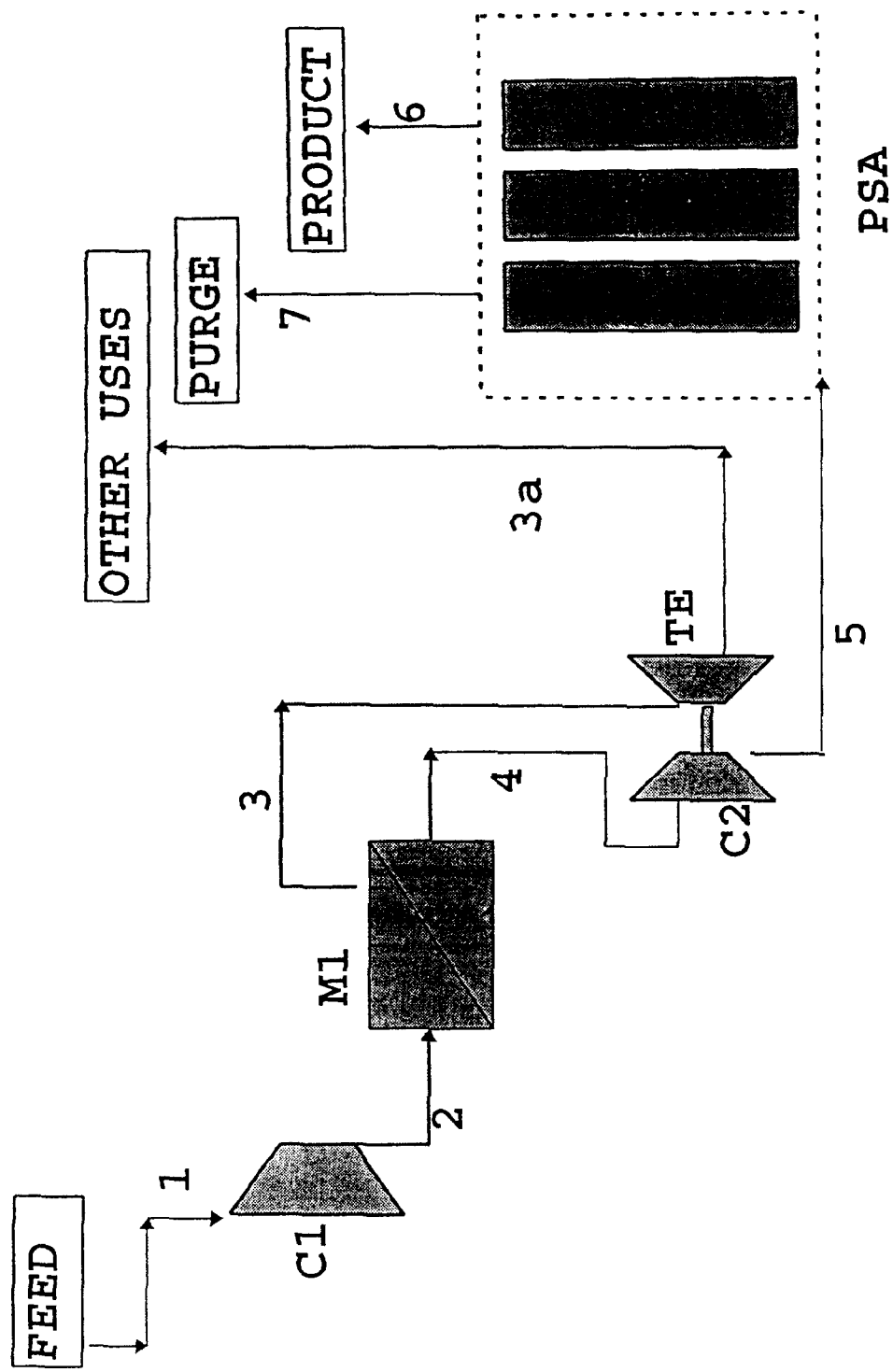
FIG. 1 is a schematic illustration of one embodiment of the present invention, where a low molar content hydrogen stream is compressed and selectively permeated on membranes, the pressure of the retentate being used to actuate a turboexpansor which in turn actuates a compressor which compresses the low-pressure permeate to pressures which are sufficient to feed the second step of the process in a PSA unit.

In the specification and claims of the present invention, the following terms have the meanings as stated below:

Low molar content and low pressure in the desired component are molar contents between 10 and 30% and pressures between 8 and 15 bar.

Very low molar contents and moderate pressures in the desired component are molar contents of at least 0.3% and pressures between 20 and 45 bar.

As regards diffusion controlled membranes used here, a high permeancy membrane is any membrane whose permeancy is at least 0.6 $Nm^3/m^2.h.bar$ and a medium selectivity membrane is any membrane whose selectivity is between 30 and 60.

Moderate temperatures are those between 40 and 120° C.

The present invention relates to the separation/recovery of components from gaseous streams, where the desired component is present in low pressure and/or low molar content in the gaseous stream, the separation/recovery being effected by combining high permeability membranes and a PSA system.

The desired component can also be present in very low molar contents and moderate pressures.

High permeability, medium selectivity membranes useful in the process of the present invention are well-known in the art. A membrane useful in the process of the present invention is described in German DE 4232496 A1, such membrane consisting essentially of a polyamideimide made from aromatic dicarboxylic acids and diamines.

The recovery of components which are present in low concentration is rendered possible by the use of membranes of high permeability to the desired component. For sure the selectivity of such membranes is not very high, since normally for dense membranes used for the separation of gases there is a compromise between the two features, permeability and selectivity so that the higher the permeability, the lower the selectivity. For hydrogen or helium, for example, whose molecules have a small kinetic diameter and no dipole moment, the more suitable membrane will be that one whose chemical structure favors the permeation by molecular size, so that smaller molecules are allowed to permeate through the molecular voids present in the polymeric structure of the membrane. The permeability or flow of permeate of a given component through a certain membrane is directly proportional to the difference in concentration of such component in the opposite sides of the membrane. When gases are separated by dense membranes, the proportionality parameters between driving force (the difference in concentration in opposite sides of the membrane) and the flow of permeate which crosses the membrane are diffusivity and solubility of the component which is permeating the membrane. These two terms combined yield what is known as permeability. The effect of the dimensions of the permeating molecule during its interaction with the molecular voids of the polymeric structure is mainly felt on the diffusivity parameter (diffusivity of the permeating molecule in the polymer), while the effects of physical and chemical affinity between the permeating molecule and the polymer that constitutes the membrane will be felt mainly on the solubility parameter (solubility of the permeating molecule in the polymer).

The polymers used to synthesize the dense selective layer of the membranes can be of various kinds. The numerous studies published on the separation of gases using dense membranes show invariably a compromise between permeability and selectivity. Thus, dense membranes which are very permeable to a given component are normally less selective for the separation of the same component from a gaseous mixture. Thus, great scientific and technological efforts were endeavoured to develop highly selective membranes to separate for example molecules of small kinetic diameter such as hydrogen and helium, whose kinetic diameters are respectively 2.9 and 2.6 Angstrom, from mixtures containing nitrogen (3.5A), $CO_2$ (3.3A) $CH_4$ (3.8 A) and other components. Then, highly selective membranes were developed which could separate molecules of very similar dimensions. However, such membranes had in general low permeability. Bearing in mind that for gases the concentration in the desired component is proportional to its partial pressure (or more precisely to its activity), the use of such membranes in the separation of gases requires that high pressures of the order of 80 to 100 bar be applied when feeding the membranes, in order to compensate for the low permeability of the component. The basic parameters to be considered in this matter are:

$$\text{Flow of permeate} = P/I.S(x_i p_{feed} - y_i p_{perm})$$

wherein

P is permeability, expressed for example in $Nm^3.m/m^2.h.bar$

I is the thickness of the membrane, expressed in meters

P/I is called permeancy, expressed in $Nm/m^2.h.bar$

S is the surface of the membrane, in square meters $p_{feed}$ and $p_{perm}$ are respectively the pressure of the feed stream and of the permeate.

$x_i$ is the mole fraction of the desired component, on the feed side $y_i$ is the mole fraction of the desired component, on the permeate side selectivity (or α) can be defined as the ratio between the permeabilities of two components through the same membrane.

On the ground of the relationships set forth above, it can be understood that in order to compensate for the low permeabilities of the highly selective commercial membranes, the state-of-the-art processes operate at high pressures. See on the equation above, the low values of P compensated by high values of $x_i p_{feed}$.

Thus, when the known processes must be dimensioned to the recovery of components of a gaseous mixture at low pressure and the desired component(s) are present in low concentrations, a compression step is necessary in order to increase the pressure of the feed stream to relatively high pressures, for example 80–100 bar. This is the case of the hydrogen gas present in molar concentrations of from 10 to 30 mole % in refinery gas streams, the pressure of the gas stream being in the range of from 8 to 15 bar. It is found that for that particular case—low pressure gas stream, low molar content of desired component in the gas stream—the state-of-the-art processes are rendered uneconomical in view, among other factors, of compression costs.

Commercial membranes such as the post-treated polyaramide membrane of the trademark MEDAL sold by L'Air Liquide (according to European Patent EP 219,878 and European Patent EP 336,999), show a permeancy (P/I or permeability/thickness of the membrane) of from 0.11 to 0.27 $Nm^3/m^2.h.bar$ for a selectivity $H_2/CH_4$ of 200.

The PRISM membrane sold by Monsanto (presently, Air Products) has a permeancy of 0.013 $Nm^3/m^2.h.bar$, even lower than the former.

Figure 4:
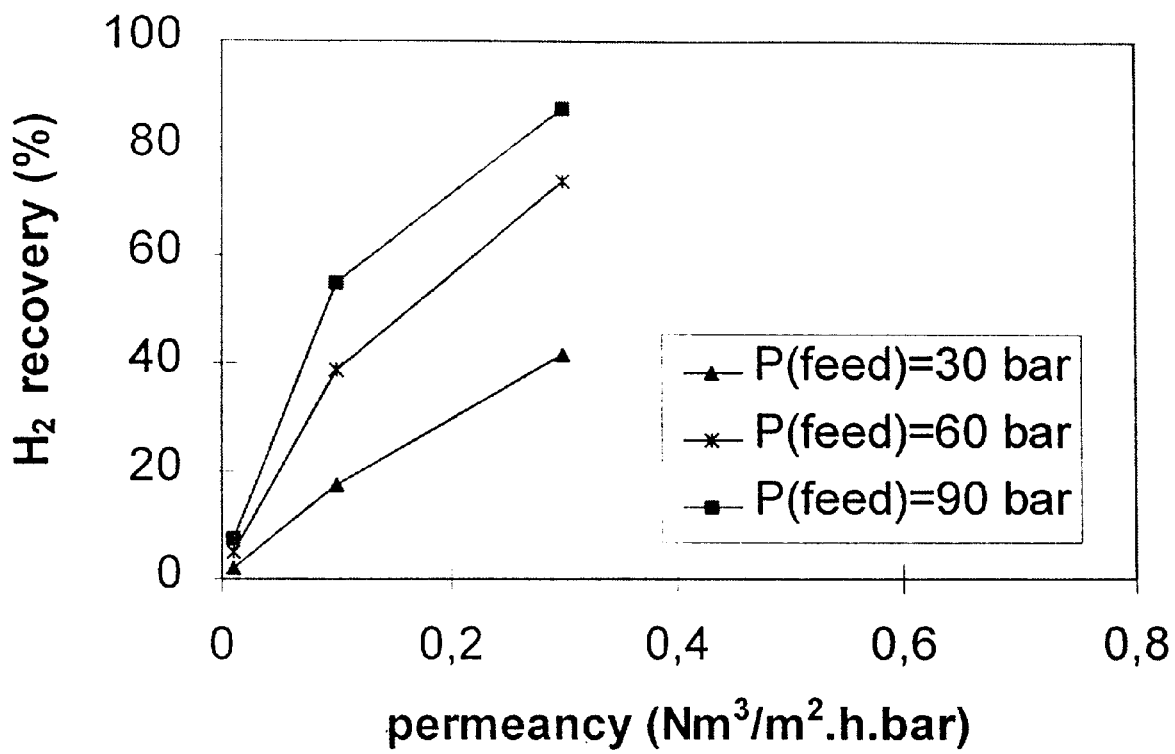
FIG. 4 is a graph of the permeancy vs. hydrogen recovery for a high selectivity/low permeancy membrane of the state-of-the-art.
Figure 5:
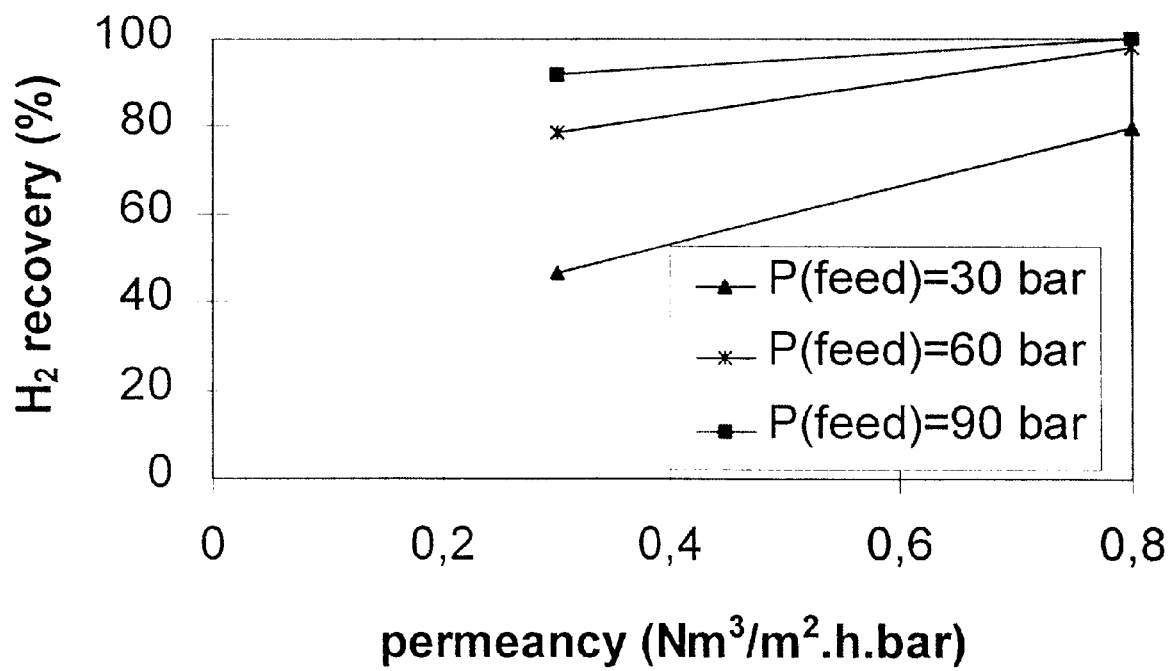
FIG. 5 is a graph of permeancy vs. hydrogen recovery for a medium selectivity/high permeancy membrane according to the present invention.

On the basis of a flow rate of 300 $Nm^3/h$, membrane surface of 30 $m^2$ and a gaseous mixture made up of 15 mole % of hydrogen and 85 mole % of methane, keeping the permeate stream at 1.5 bar, for example, the recovery rate of hydrogen for membranes of different selectivities is illustrated on FIGS. 4 and 5. On FIG. 4 the membrane used has a selectivity $H_2/CH_4$ of 200 (membrane used in state-of-the-art processes) and permeancy varying from 0.01 to 0.3 while on FIG. 5 the selectivity $H_2/CH_4$ of the membrane is around 30 and the permeancy varies from 0.3 to 0.8 (membranes used in the present invention).

According to FIG. 4, the high selectivity membrane requires that in order to reach hydrogen recovery values around 80% pressures of the order of 90 bar are necessary, for permeancies in the range of 0.2–0.3 $Nm^3/m^2.h.bar$.

On the contrary, as illustrated on FIG. 5, higher permeability membranes allow a better recovery of the hydrogen present in the gaseous mixture even at low pressures. From this FIGURE it is clear that recoveries of the order of 80% are possible at pressures as low as 30 bar when permeancy (and consequently permeability) is high.

It should be noted that in view of the fact that to a high permeability always corresponds a low selectivity, the purity of the gaseous component recovered through a process as illustrated on FIG. 5 of the present invention, is always lower than that of the gaseous component recovered through the known processes which employ more selective membranes. That is why in the present process the desired component, after the membrane separation step, must be further submitted to a PSA purification step.

However, on an overall basis, the present process is energetically favored in view of the reduction in compression costs.

Preferably, the permeancy P/I values of the membranes useful in the practice of the present invention are at least 0.6 $Nm^3/m^2.h.bar$, with 0.8 being an adequate value. Selectivity values of the membranes suitable in the practice of the present invention are in the range of from 30 to 60 to hydrogen as related to other gaseous components like methane, the membrane being fed with a gaseous mixture which allows to observe an actual permeancy and actual selectivity. This is because it is known that figures for permeability and selectivity obtained from pure gases do not convey the actual figures shown when a gaseous multicomponent mixture of gases is submitted to a membrane separation. The adequate range of selectivities is that which, at its lower limit, leads to a hydrogen-enriched stream of a concentration which is sufficient to be purified in the PSA unit which is connected with the membrane unit. The upper limit of the selectivity range is that where it is still possible to obtain permeancy to hydrogen sufficiently high (in the range of 0.6 to 1.0 $Nm^3/m^2.h.bar$).

In view of the fact that the operation of the process of the present invention requires high permeability membranes, it can be stated that the minimum permeancy of the useful membranes for the practice of the present invention is 0.6 $Nm^3/m^2.h.bar$, the upper limit being up to the present moment limited to 1.0 $Nm^3/m^2.h.bar$, but extensible to higher values as soon as new, increasingly more permeable membranes are developed/ available.

Of course it would be highly desirable to obtain membranes having high permeancy as well as high selectivities. However, this is not the trend and generally there is an inverse relationship between the permeation rate of the component (flow) and the selectivity of the membrane to the desired component relative to the other components of the gaseous mixture, for various classes of vitreous polymers, for example, polyimides, polyamides and polyamide-imides. Thus, membranes made from these polymers either exhibit high permeation rates to the desired component, the selectivities being somehow reduced, or either they exhibit high selectivities, the flow of permeate being then correspondingly reduced for the desired component.

The PSA or Pressure Swing Adsorption is based on the principle that an adsorbent can retain more impurities as the pressure is increased. Thus, as pressure oscillates from a higher value to a lower value, the adsorbed impurities are desorbed and rejected to the waste gas stream. The present PSA systems can be tailored to remove practically any impurity from the gaseous stream. The PSA system which adsorbs the non-desired components present in the permeate stream operates through pressure swing, vacuum swing, temperature swing, or a combination of these swings.

The PSA process comprises the following steps:

adsorption, where the feed is introduced in an adsorber, the impurities are adsorbed and the desired component is recovered;

depressurization, where the adsorber is partially depressurized, and hydrogen is transferred to different adsorbers;

counter-current depressurization where the adsorber is depressurized up to the lowest pressure level, the adsorbent is partially regenerated and a substantial part of the impurities are rejected;

purge, where hydrogen is used to purge the remaining impurities and complete the regeneration of the adsorbent;

repressurization, where the adsorbent is repressurized with hydrogen up to the pressure level of the feed, closing one adsorption cycle and ready for initiating another adsorption cycle.

As referred to above, the present process is applied to the separation/recovery of desired components from streams where these components are present at low pressures and/or low molar contents. For example, refinery off gases, where hydrogen admixed to methane and/or other hydrocarbon gases is present at contents of from 10 to 30 mole %, in gaseous streams with pressures in the range of from 8 to 15 bar. Helium gas present in oil/gas reservoirs in admixture with light hydrocarbons and possibly other gases like $N_2$ and $CO_2$ can also be separated/recovered by using the process of the present invention.

Generally considered, in the process of the present invention the low-pressure gaseous stream which contains a low molar content of the desired component is compressed of from 20 and to 45 bar at a temperature between 40 and 120° C. and fed to a permeable membrane separation unit having a minimum permeancy of 0.6 $Nm^3/m^2.h.bar$ fr the desired component, for example, a membrane of permeability 0.8 $Nm^3/m^2.h.bar$. The selectivity of the membrane is between 30 and 60. Upon exiting the membrane unit, there is produced a permeate stream enriched in the desired component, for example hydrogen, and a lean stream in the desired component, or a retentate stream.

Usually, the pressure of the retentate stream is between 19 and 44 bar, a typical value being 29 bar. The molar content in the desired component is of from 4 to 8%. The pressure of the permeate stream is between 1.5 to 3.0 bar, a typical value being around 2 bar. The molar content of the desired component is around 45 to 80%, with a typical value around 70 mole %.

In view of the fact that the pressure of the permeate stream is relatively low while the pressure of the retentate stream is relatively higher, the retentate stream is made to convey its pressure to a turboexpander which in turn drives a compressor so that the pressure of the permeate stream is increased. This makes possible the further contact of the permeate stream of elevated pressure with the PSA unit where the permeate stream will be further purified. Alternatively a vacuum pump driven by a turboexpander may be installed to reduce the permeate pressure, thus substantially increasing the pressure ratio across the membrane and further increasing the permeability, even at low feed pressure. The permeate stream more enriched in the desired component, e.g. helium, may then be recompressed and directed to either another membrane unit or directly to the PSA unit. In a particular embodiment of the present invention, the aforementioned vacuum pump can be a liquid ring pump selectively adsorbing a second desired component.

The permeate stream is fed to the PSA unit at a pressure between 18.0 and 25.0 bar and at a temperature between 25 and 60° C.

Upon adsorption of the non-desired component(s) on the PSA unit, the desired component that can be separated/recovered reaches 95.0 to 99.99 mole %, with a typical value of 99.90 mole %.

DETAILED DESCRIPTION OF THE DRAWINGS

As illustrated in the embodiment of FIG. 1, the process of the present invention comprises a low-pressure feed stream 1 of refinery off gas or any other gaseous stream which contains the desired component in low molar content admixed to hydrocarbons and other gases, feed stream 1 being compressed in a compressor C1 in order that the pressure of the stream attains adequate levels for permeation through the membrane unit, for example, a pressure between 25 and 40 bar and temperature between 25 and 100° C. The membrane system normally comprises an array of membranes in the shape of frames and plates, hollow fibers, spiral or envelopes.

Stream 2 is then fed to the first step of the separation/recovery process which comprises a selectively permeable membrane unit M1. Upon permeation of the selective membrane unit is produced a stream 3 or retentate, lean in the desired component, and a stream 4 or permeate, enriched in the desired component. Having not been permeated, retentate stream 3 retains the pressure levels of stream 2, while permeate stream 4 loses pressure relative to stream 2. In order to lower costs, stream 3 is directed to a turboexpansor TE to exchange pressure with compressor C2 and transfer the excess pressure of stream 3 to low-pressure permeate stream 4. The low-pressure retentate effluent from turboexpander TE is stream 3a which is burned as fuel or otherwise discarded. The stream enriched in desired component and having working pressures adequate for the next process step, for example between 18 and 25 bar, is stream 5 which is directed to the PSA system for further separation/recovery. The temperature of stream 5 is between 25 and 60° C. Upon exiting the PSA unit, stream 6 is the purified product, 99.0 to 99.90 mole % in hydrogen or another desired component. The purge stream 7 from the PSA unit is directed to special burners, designed to work with low pressure gases.

Figure 2:
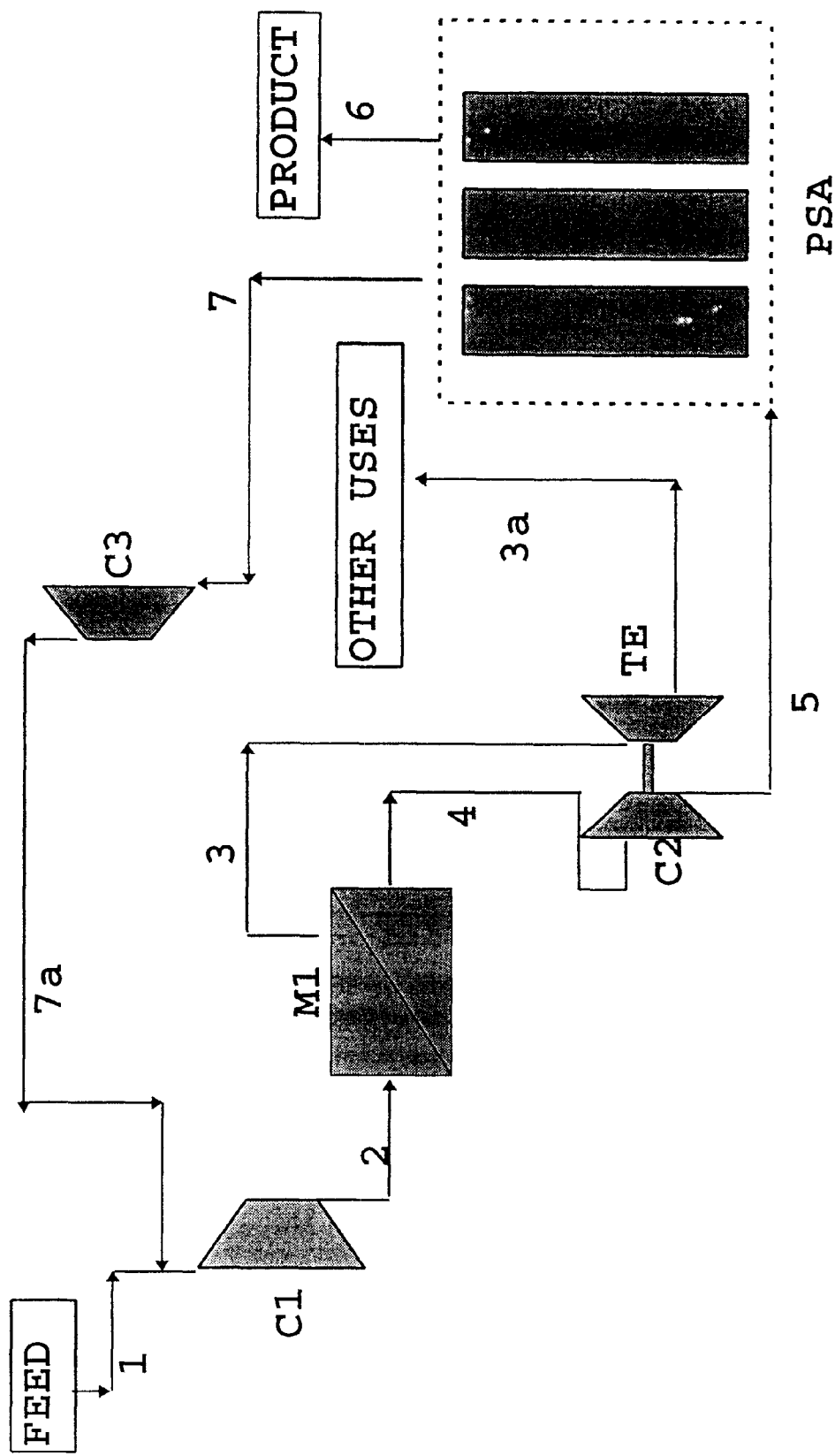
FIG. 2 is a schematic illustration of another embodiment for the separation/recovery of hydrogen according to the present invention, where the purge stream of the PSA unit is recycled to the inlet of the membrane system so as to increase the overall recovery of the system.

FIG. 2 illustrates another embodiment of the present invention. Basically FIG. 1 and FIG. 2 depict same streams 1, 2, 3, 3a, 4, 5 and 6 and membane unit M1, compressors C1 and C2 and turbo expander TE. However the embodiment illustrated on FIG. 2 contemplates an arrangement where stream 7 which is the PSA purge is compressed in compressor C3 to form compressed purge stream 7a, which is fed to compressor C1 together with feed stream 1.

The PSA unit contains adsorbents which selectively retain the non-desired gaseous components, so as to yield a purified product stream. The non-desired gaseous components are later desorbed, and a purge gaseous stream 7 leaves the adsorption PSA unit, containing the non-desired components, together with a portion of the desired component, which optionally can be recycled to the feed of the membrane system. The adsorbents useful for the PSA units of the present invention can be varied, including molecular sieves of activated carbon or zeolitic materials, such as faujasites and mordenites.

Besides the use of stream 7 of purge gas of the PSA unit in admixture with the feed to the membrane system, a portion of stream 6 of desired component can be used as rinse gas of the PSA unit, after the desorption step.

The use of the PSA unit in the purification of hydrogen is based on the ability of the adsorbents to retain more impurities at elevated partial pressures in the gas phase than at low partial pressure. The partial pressure of the impurities is reduced by varying the operation pressure of the adsorber. This pressure is reduced from the value of the feed pressure down to the purge pressure (tail gas) at the same time when the system is rinsed with high purity hydrogen. Hydrogen should be adsorbed in small increments.

The process is cyclic and a series of beds should be used in order to allow constant flowrates of feed, product and purge.

Each adsorber executes the same process steps in the same sequence. However, the various steps are displaced in time. The process steps are: adsorption; co-current depressurization; initial purge (cocurrent depressurization); counter-current depressurization; final repressurization. Normally of from 2 to 12 adsorbers are used in series.

The driving force for the separation is the difference in partial pressures shown by the impurities, between the feed and the purge gas. A minimum ratio of 4:1 between the pressures of feed and purge is normally required for separating hydrogen. However, the absolute pressures of feed and purge gas are equally important. The optimum range of feed pressures for refinery PSA units is of from 18 to 25 bar.

The optimum pressure for the purge gas is the lowest possible one, the process performance is much more sensitive to the pressure of the purge than to the pressure of the feed.

The first process step using the membrane system leads to the recovery of a desired component in the range around 80 mole %. This same amount can be recovered using PSA separation/purification. Therefore the overall yield is 64%. In case the waste stream of the PSA unit is recompressed and recycled to the membrane system the recovery rate can reach 76 mole % of the desired component.

Figure 3:
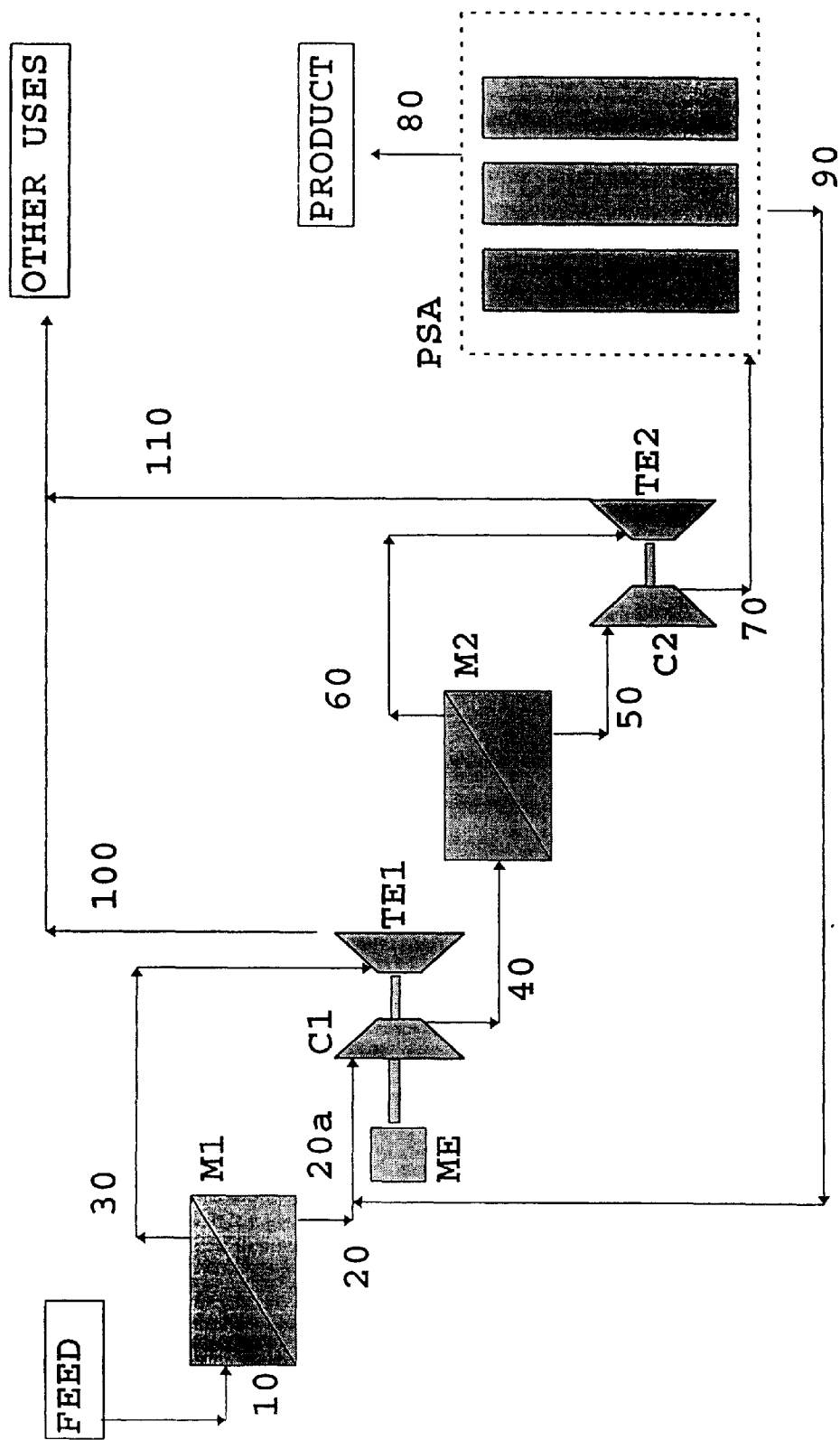
FIG. 3 is a schematic illustration of an embodiment of the present invention where a helium-containing stream is directed to a membrane unit, permeated, the permeate is directed to a second, similar membrane unit and then the permeate of the second membrane unit is directed to a PSA unit.

FIG. 3 illustrates an embodiment of the present invention specially suited to the separation/recovery of helium from any helium-containing stream. A moderate-pressure feed stream 10 of natural gas or any other gaseous stream which contains the desired component in very low molar content admixed to hydrocarbons and other gases is fed to the first permeable membrane unit M1. Upon permeation a stream 20 or first permeate, enriched in the desired component, and a stream 30 or first retentate, lean in the desired component, are produced. Although not shown on FIG. 3, a vacuum pump may be installed to such the first permeate stream 20, to increase pressure ratio across the permeable membrane M1. First retentate stream 30 retains the pressure levels of feed stream 10, while first permeate stream 20 loses pressure relative to feed stream 10. In order to lower costs/energy demand, first retentate stream 30 is directed to a turbo-expander TE1 to drive compressor C1 and transfer the excess pressure inventory of first retentate stream 30 to low-pressure stream 20*a* which is a blend of first permeate stream 20 and purge stream 90 from the PSA unit. At least one of the compressors may be driven by an eletrical motor ME or by another high pressure gas stream, to allow the compressor C1 to raise stream 20*a* to the desired pressure of stream 40. The low-pressure retentate effluent from turboexpander TE1, stream 100, is sent to other uses, for example as a fuel. The elevated-pressure gas stream 40 is fed to the second permeable membrane unit M2. In this unit a stream 50 or second permeate stream, enriched in the desired component, and a stream 60 or second retentate stream, lean in the desired component, are produced. Second retentate stream 60 retains the pressure levels of stream 40, while second permeate stream 50 loses pressure relative to stream 40. In order to lower costs/energy demand, second retentate stream 60 is directed to a turbo-expander TE2 to drive compressor C2 and transfer the excess inventory pressure of second retentate stream 60 to low-pressure second permeate stream 50. The low-pressure retentate effluent from turboexpander TE2, stream 110, is mixed with stream 100 and sent to other uses, for example, as a fuel. Stream 70 enriched in desired component and having working pressures adequate for the next process step, for example between 18 and 25 bar, is directed to the PSA system for further separation/recovery. The temperature of stream 70 is between 25 and 60° C.

Upon exiting the PSA unit, stream 80 is the purified product, 99.0 to 99.90 mole % in helium.

The present invention will now be illustrated by the following Examples, which should not be considered as limiting the same.

EXAMPLE 1

A feed stream 1 of refinery off gas from the FCC unit containing 18.8 mole % hydrogen in admixture with other gases as indicated on TABLE 1 below was submitted to the process of the present invention. In view of the fact that the pressure of stream 1—12 bar—is too low in order that it be permeated through a membrane system, feed stream 1 is compressed in a compressor C1 as illustrated on FIG. 1 so as to have its pressure increased to up to 30 bar. The process temperature is 30° C. Stream 2 having a pressure of 30 bar and at 30° C. is then permeated through a membrane unit M1 of minimum permeancy around 0.6 $Nm^3/m^2.h.bar$, typically 0.8 $Nm^3/m^2.h.bar$ and selectivity 30. Permeation through the membrane unit M1 yields two streams: a retentate or non-permeate stream 3 lean in hydrogen (around 5 mole %) and at nearly the same pressure as stream 2 and a permeate stream 4 enriched in hydrogen (around 70 mole %) where the pressure has been reduced to 2 bar. As the pressure of stream 4 enriched in hydrogen is too low to be directed to the second step of the process, that is, the PSA unit, the pressure of stream 4 is made to increase by using stream 3 to transfer pressure to a turbo expander TE which in turn drives a compressor or booster C2 which will compress hydrogen-rich stream 4 up to pressures of 18 to 25 bar, for example 20 bar. Hydrogen recovery through the membrane unit leads to recovery values of the order of 80 mole % in the desired component (for example, hydrogen) from feed stream 1. The retentate effluent from turboexpander TE, stream 3*a,* leaves the turboexpansor at a pressure of around 6 bar and is directed to a fuel gas unit in order to be burned. Hydrogen-rich stream 5 exiting compressor or booster C2 can be directed to a Pressure Swing Adsorption System made up of at least two beds in series containing zeolites as adsorbing phase. Stream 5 is at a pressure betwen 18 and 25 bar, for example 20 bar, and at a temperature of between 25 ad 60° C., for example 35° C. Upon exiting the PSA system, product stream 6 is around 99.90 mole % pure hydrogen. Waste stream 7 also exiting the PSA unit and containing the impurities is discarded. Overall recovery rate in this Example is around 64 mole %.

TABLE 1 below lists the corresponding mass balance for Example 1.

TABLE 1

Table 1 - Mass balance - without PSA purge recycle
membrane recovery: 80,0%
PSA recovery: 80,0%

|  | stream1 = stream2 | | stream4 = stream5 | | stream3 | | stream6 | |
| --- | --- | --- | --- | --- | --- | --- | --- | --- |
|  | kgmol/h | % vol | kgmol/h | % vol | kgmol/h | % vol | kgmol/h | % vol |
| H2 | 193.076 | 18.80 | 154.46 | 70.00 | 38.62 | 4.79 | 123.569 | 99.90 |
| N2 | 63.674 | 6.20 | 5.05 | 2.29 | 58.62 | 7.27 | 0.0094 | 0.0076 |

TABLE 1-continued

Table 1 - Mass balance - without PSA purge recycle
membrane recovery: 80,0%
PSA recovery: 80,0%

|  | stream1 = stream2 | | stream4 = stream5 | | stream3 | | stream6 | |
| --- | --- | --- | --- | --- | --- | --- | --- | --- |
|  | kgmol/h | % vol | kgmol/h | % vol | kgmol/h | % vol | kgmol/h | % vol |
| O2 | 3.081 | 0.30 | 0.24 | 0.11 | 2.84 | 0.35 | 0.0005 | 0.0004 |
| CO | 12.324 | 1.20 | 0.98 | 0.44 | 11.35 | 1.41 | 0.0018 | 0.0015 |
| CO2 | 3.081 | 0.30 | 0.24 | 0.11 | 2.84 | 0.35 | 0.0005 | 0.0004 |
| CH4 | 355.342 | 34.60 | 28.21 | 12.78 | 327.13 | 40.57 | 0.0527 | 0.0426 |
| C2H4 | 128.375 | 12.50 | 10.19 | 4.62 | 118.18 | 14.66 | 0.0190 | 0.0154 |
| C2H6 | 215.67 | 21.00 | 17.12 | 7.76 | 198.55 | 24.62 | 0.0320 | 0.0259 |
| C3H6 | 30.6046 | 2.98 | 2.43 | 1.10 | 28.18 | 3.49 | 0.0045 | 0.0037 |
| C3H8 | 11.297 | 1.10 | 0.90 | 0.41 | 10.40 | 1.29 | 0.0017 | 0.0014 |
| C4+ | 10.27 | 1.00 | 0.82 | 0.37 | 9.45 | 1.17 | 0.0015 | 0.0012 |
| H2S | 0.2054 | 0.02 | 0.02 | 0.01 | 0.19 | 0.02 | 0.0000 | 0.0000 |
| total | 1027 | 100.00 | 220.66 | 100.00 | 806.34 | 100.00 | 123.692 | 100.00 |

EXAMPLE 2

This Example illustrates an embodiment of the present invention where the waste stream of the PSA unit—stream 7—and typically having pressure around 0.2 to 0.5 bar and hydrogen molar content around 32 mole % is directed to a compressor C3 to increase pressure and combined to feed stream 1 to be directed to permeation through membrane unit M1. Thus, the overall recovery reaches 76%. In this embodiment a higher recovery is obtained at a slightly higher cost due to additional compression of stream 7. FIG. 2 illustrates the embodiment while TABLE 2 attached lists the mass balance with PSA purge recycle.

TABLE 2

|  | stream1 | | stream2 | | stream4 = 5 | | stream3 | | stream6 | | stream7 | |
| --- | --- | --- | --- | --- | --- | --- | --- | --- | --- | --- | --- | --- |
|  | kgmol/h | % | kgmol/h | % | kgmol/h | % | kgmol/h | % | kgmol/h | % | kgmol/h | % |
| H2 | 193.08 | 18.80 | 229.54 | 20.10 | 183.63 | 70.00 | 45.91 | 5.22 | 146.91 | 99.90 | 36.73 | 31.86 |
| N2 | 63.67 | 6.20 | 69.67 | 6.10 | 6.01 | 2.29 | 63.66 | 7.24 | 0.01 | 0.01 | 6.00 | 5.20 |
| O2 | 3.08 | 0.30 | 3.37 | 0.30 | 0.29 | 0.11 | 3.08 | 0.35 | 0.00 | 0.00 | 0.29 | 0.25 |
| CO | 12.32 | 1.20 | 13.48 | 1.18 | 1.16 | 0.44 | 12.32 | 1.40 | 0.00 | 0.00 | 1.16 | 1.01 |
| CO2 | 3.08 | 0.30 | 3.37 | 0.30 | 0.29 | 0.11 | 3.08 | 0.35 | 0.00 | 0.00 | 0.29 | 0.25 |
| CH4 | 355.34 | 34.60 | 388.81 | 34.05 | 33.53 | 12.78 | 355.27 | 40.39 | 0.06 | 0.04 | 33.47 | 29.04 |
| C2H4 | 128.38 | 12.50 | 140.46 | 12.30 | 12.12 | 4.62 | 128.35 | 14.59 | 0.02 | 0.02 | 12.09 | 10.49 |
| C2H6 | 215.67 | 21.00 | 235.98 | 20.66 | 20.35 | 7.76 | 215.63 | 24.51 | 0.04 | 0.03 | 20.32 | 17.62 |
| C3H6 | 30.60 | 2.98 | 33.49 | 2.93 | 2.89 | 1.10 | 30.60 | 3.48 | 0.01 | 0.00 | 2.88 | 2.50 |
| C3H8 | 11.30 | 1.10 | 12.36 | 1.08 | 1.07 | 0.41 | 11.29 | 1.28 | 0.00 | 0.00 | 1.06 | 0.92 |
| C4+ | 10.27 | 1.00 | 11.24 | 0.98 | 0.97 | 0.37 | 10.27 | 1.17 | 0.00 | 0.00 | 0.97 | 0.84 |
| H2S | 0.21 | 0.02 | 0.22 | 0.02 | 0.02 | 0.01 | 0.21 | 0.02 | 0.00 | 0.00 | 0.02 | 0.02 |
| total | 1027.00 | 100.0 | 1142.00 | 100.0 | 262.33 | 100.0 | 879.67 | 100.0 | 147.05 | 100.0 | 115.28 | 100.0 |

TABLE 3

| stream |  | 1 | 2 | 3 | 4 | 5 | 6 | 7 |
| --- | --- | --- | --- | --- | --- | --- | --- | --- |
| operation pressure | bar | 12.0 | 30.0 | 29.0 | 2.0 | 20.0 | 19.0 | 0.35 |
| minimum pressure | bar | 8.0 | 20.0 | 19.0 | 1.5 | 18.0 | 17.0 | 0.3 |
| maximum pressure | bar | 15.0 | 45.0 | 44.0 | 3.0 | 25.0 | 24.0 | 0.6 |
| process temperature | ° C. | 35 | 80 | 80 | 80 | 35 | 35 | 35 |

TABLE 3 below ilustrates the process conditions for the present invention. It can be seen that stream 2 is submitted to permeation through the membrane unit at a temperature between 40 and 120° C., preferably between 70 and 80° C. and pressure between 25–40 bar, preferably 30–40 bar. Maximum temperature for stream 2 is a function of the thermal strength of the membrane used in the process as well as of the stuff used to make the membrane modulus. Stream 5 is submitted to purification in the PSA unit at a temperature between 25 and 60° C., preferably 35–45° C., and pressure between 18 and 25 bar, preferably 19–21 bar.

TABLE 3-continued

| stream |  | 1 | 2 | 3 | 4 | 5 | 6 | 7 |
| --- | --- | --- | --- | --- | --- | --- | --- | --- |
| minimum temperature | ° C. | 25 | 40 | 40 | 40 | 25 | 25 | 25 |
| maximum temperature | ° C. | 45 | 120 | 120 | 120 | 60 | 60 | 60 |
| % H2 operation | molar | 18.8 | 20.1 | 5.2 | 70.0 | 70.0 | 99.9 | 30.0 |
| % H2 min | molar | 10.0 | 10.0 | 4.0 | 45.0 | 45.0 | 95.0 | 25.0 |
| % H2 max | molar | 30.0 | 30.0 | 8.0 | 80.0 | 80.0 | 99.99 | 40.0 |

EXAMPLE 3

This Example illustrates the present invention in case the desired component is helium, present for example in very low molar content and moderate pressure in any helium-containing stream. As shown in FIG. 3, feed stream is directed to a set of two membranes and a PSA system. Process conditions are set forth on TABLE 4 below. The overall recovery rate for helium is about 50%.

TABLE 4

| Table 4 - Mass balance and process conditions - with PSA purge recycle - Helium recovery | | | | | | | | | | | |
|---|---|---|---|---|---|---|---|---|---|---|---|
| Stream | | 10 | 20 | 20a | 30 | 40 | 50 | 60 | 70 | 80 | 90 |
| flow rate | Nm3/h | 40569 | 2321 | 2466 | 38248 | 2466 | 245 | 2221 | 245 | 100 | 145 |
| % He | molar | 0.5 | 6.0 | 6.6 | 0.166 | 6.6 | 50.8 | 1.72 | 50.8 | 99.9 | 16.9 |
| % CH4 | molar | 99.5 | 94.0 | 93.4 | 98.8 | 93.4 | 49.2 | 98.8 | 49.2 | 0.1 | 0.1 |
| operation pressure | bar | 45 | 1.5 | 1.5 | 44 | 45 | 1.5 | 44 | 20 | 19 | 1.5 |

Therefore, the three embodiments of the present invention demonstrate that by the adequate choice of permeability/selectivity of a membrane unit combined to a PSA unit it is possible to attain moderate to high rates of recovery of a desired component present in low/very low molar amount in a low/moderate pressure stream.

Also, the flexibility of the present process permits a certain array of modifications and variations that make possible not only the separation/recovery of gases such as hydrogen and helium, besides other gases, at low cost, but also, by adding well-known, state-of-the-art equipment, the recovery of other valuable streams, such as for example, $C2^+$ streams.

Figure 6:
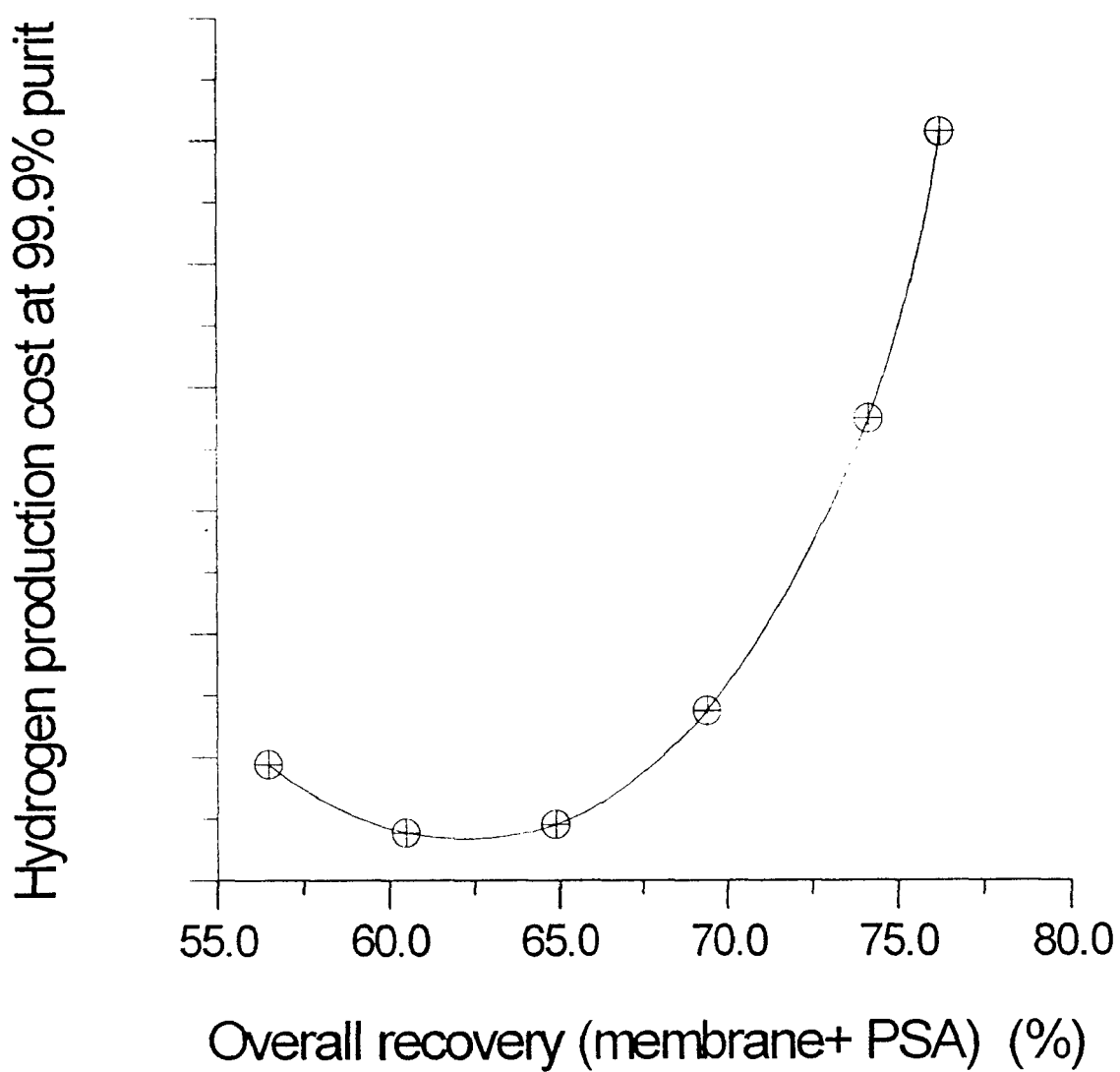
FIG. 6 is a graph of the hydrogen cost as a function of the overall recovery rate in a membrane+PSA system according to the present invention.

As an illustration of the relationship between hydrogen cost and recovery rate, FIG. 6 shows that it is desirable to obtain rather moderate recovery rates of hydrogen at low cost to attain the main goal of the invention related to energy saving.

Besides, the present invention, as herein described and claimed, may be used to provide gases for different uses such as fuel for motor vehicles, steel works and the hydrogenation of foodstuffs.

Further, the separation/recovery process of the invention is useful not only for off-gas from FCC units, but also for several petrochemical processes which generate gaseous streams where the desired component is present at low molar contents and/or low pressure.

We claim:

1. A process for the separation/recovery of gases with the aid of a membrane/PSA system from a stream where the desired component is present at low molar concentration and/or low pressure, which consists essentially of the following steps:

compressing and directing the compressed feed stream containing the desired component at moderate temperature and pressure to a membrane unit of high permeability and medium selectivity whereby are separated a low pressure stream enriched in the desired component—the permeate stream—and a lean stream or retentate, enriched in non-desired component(s) at pressure close to that of the feed;

saving energy by conveying the pressure inventory from the retentate stream to the permeate stream so as to elevate the permeate pressure;

directing the permeate stream at elevated pressure to a PSA system which selectively adsorbs non-desired components, for purification of the desired component;

recovering the desired component from the PSA system;

desorbing and discarding the purge stream containing the non-desired components from the PSA system.

2. A process for the separation/recovery of gases with the aid of a membrane/PSA system from a stream where the desired component is present at low molar concentration and/or low pressure, which consists essentially of the following steps:

compressing and directing the compressed feed stream containing the desired component at moderate temperature and pressure to a membrane unit of high permeability and medium selectivity whereby are separated a low pressure stream enriched in the desired component—the permeate stream—and a lean stream or retentate, enriched in non-desired component(s) of pressure close to that of the feed;

saving energy by conveying the pressure inventory from the retentate stream to the permeate stream so as to elevate the permeate pressure;

directing the permeate stream at elevated pressure to a PSA system which selectively adsorbs non-desired components, for purification of the desired component;

recovering the desired component from the PSA system;

desorbing the purge stream containing the non-desired components from the PSA system;

compressing and recycling the purge stream from the PSA system to the membrane separation unit, combining said purge stream from the PSA system with the feed stream and resuming the permeation/purification cycle.

3. A process for the separation/recovery of gases according to claims 1 or 2, wherein the desired component is present in the feed stream of a refinery off gas, in molar contents between 10 to 30% and at a pressure between 8 and 15 bar.

4. A process for the separation/recovery of gases according to claim 3, wherein the desired component is present in the feed stream of a refinery off gas from an FCC unit.

5. A process for the separation/recovery of gases with the aid of a membrane/PSA system from a stream where the desired component is present at very low molar concentration and moderate pressure which consists essentially of the following steps:

directing the feed stream containing the desired component at moderate temperature and pressure to a first membrane unit of high permeability and medium selectivity whereby are separated a first, low pressure stream enriched in the desired component the first permeate stream—and a first lean stream or first retentate, enriched in non-desired component(s) of pressure close to that of the feed;

saving energy by conveying the pressure inventory from the first retentate stream to the first permeate stream so as to elevate the permeate pressure;

directing the first permeate stream enriched in the desired component to a second membrane unit of high permeability and medium selectivity whereby are separated a second, low pressure stream enriched in the desired component—the second permeate stream—and a second, lean stream or second retentate, enriched in non-desired component(s) at pressure close to that of the feed;

saving energy by conveying the pressure inventory from the second retentate stream to the second permeate stream so as to elevate the second permeate pressure;

directing the second permeate stream at elevated pressure to a PSA system which selectively adsorbs non-desired components, for purification of the desired component;

recovering the desired component from the PSA system;

desorbing the purge stream containing the non-desired components from the PSA system;

recycling and combining the purge stream from the PSA system with the first permeate stream to be compressed and directed to the second membrane unit.

6. A process for the separation/recovery of gases according to claim 5, wherein the gas stream contains helium as the desired component at a concentration of at least 0.3 mole %.

7. A process for the separation/recovery of gases according to claim 5, wherein the permeate stream(s) are operated at further reduced pressure, generated by a vacuum pump, so as to generate an improved pressure ratio, applicable if $H_2$ free permeates only.

8. A process for the separation/recovery of gases according to claim 7, wherein said vacuum pump is a liquid ring pump selectively adsorbing a second desired component.

9. A process for the separation/recovery of gases according to claims 1, 2 or 5, wherein the feed stream at elevated pressure is directed to the membrane separation unit(s) at a temperature between 40 and 120° C. and a pressure between 20 and 45 bar.

10. A process for the separation/recovery of gases according to claim 9, wherein the temperature at which the feed stream at elevated pressure is directed to the membrane unit(s) is between 70 and 80° C. and the pressure is between 30 and 40 bar.

11. A process for the separation/recovery of gases according to claims 1, 2 or 5, wherein any retentate stream drives a turboexpander which in turn drives a compressor in order to convey the pressure inventory of said retentate stream to respective permeate stream.

12. A process for the separation/recovery of gases according to claims 1, 2 or 5, wherein the permeate stream directed to the PSA system is at a temperature between 25 and 60° C. and at a pressure between 18 and 25 bar.

13. A process for the separation/recovery of gases according to claim 12, wherein the temperature of the permeate stream directed to the PSA system is between 35 and 45° C. and the pressure is between 19 to 21 bar.

14. A process for the separation/recovery of gases according to claims 1, 2 or 5, wherein the purity of the desired component recovered from the PSA system is between 99.0 and 99.90 mole % and at an overall recovery rate of between 40 to 60% for helium and from 60 and 80% for hydrogen.

15. A process for the separation/recovery of gases according to claims 1, 2 or 5, wherein the separation unit made up of permeable membranes contains polymeric membranes of minimum permeancy 0.6 $Nm^3/m^2$.h.bar and selectivity between 30 and 60.

16. A process for the separation/recovery of gases according to claims 1, 2 or 5, wherein the PSA system which adsorbs the non-desired components present in the permeate stream operates through pressure swing, vacuum swing, temperature swing or a combination of these swings.

17. A process for the separation/recovery of gases according to claims 1, 2 or 5, wherein the PSA system is operated according to single- or multi-bed mode, using adsorption materials which are tailored to the particular composition of gas streams to be separated/recovered.

18. A process for the separation/recovery of gases according to claims 1, 2 or 5, wherein a portion of the desired component which has been separated/recovered is used to rinse the PSA system after desorption of the adsorbed, non-desired component.

19. A process for the separation/recovery of gases according to claims 1, 2 or 5, wherein the permeable membrane is made of a polyamideimide.

20. A process for the separation/recovery of gases according to claims 1, 2 or 5, wherein the permeable membrane is made of an aromatic polyimide.

21. A process for the separation/recovery of gases according to claims 1, 2 or 5, wherein after conveying the pressure inventory to the permeate stream, the retentate stream is directed to other uses.

* * * * *